Feb. 18, 1941.   R. O. LETSCH   2,232,120
VEHICLE
Filed Sept. 16, 1939   3 Sheets-Sheet 1
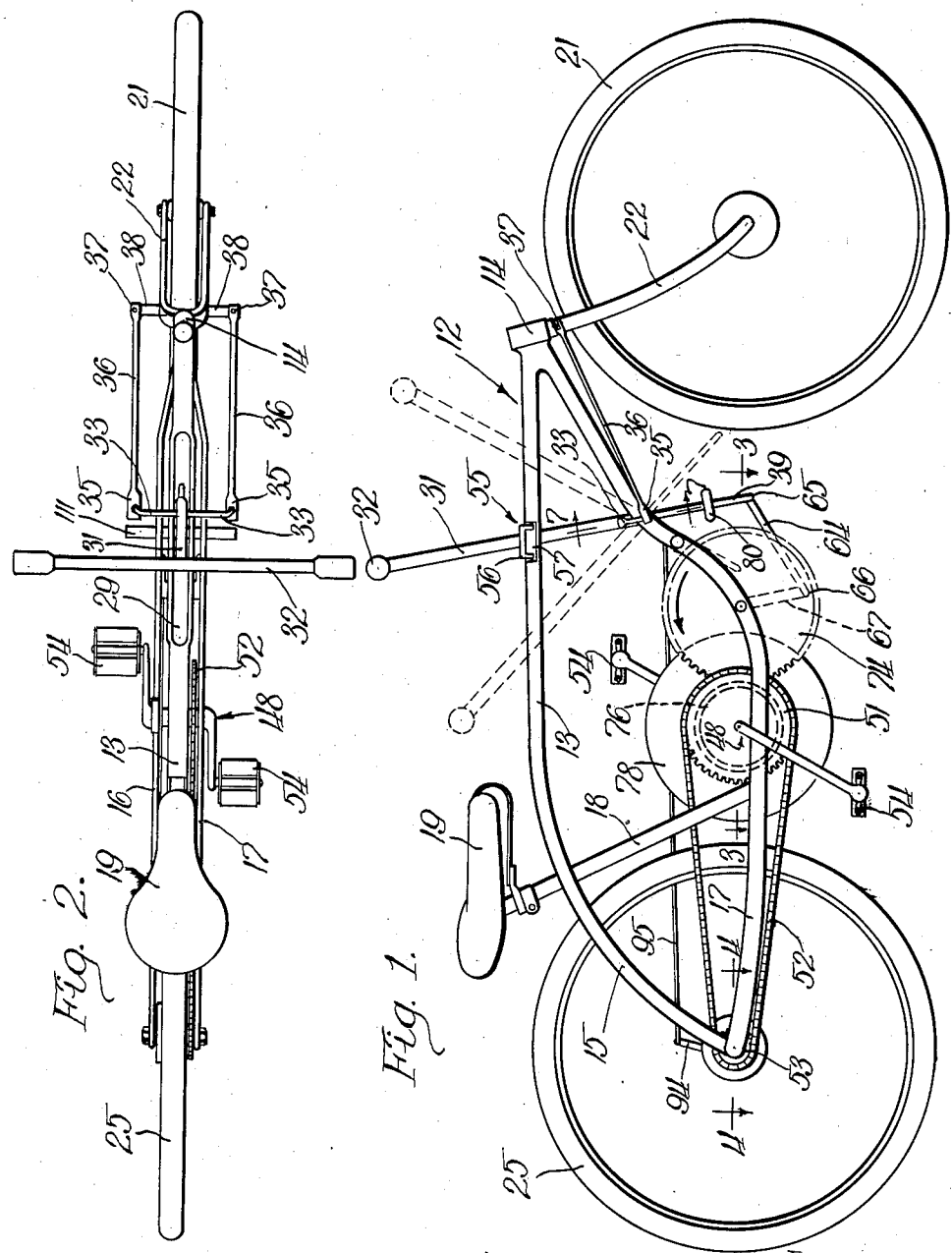
Inventor:
Raymond O. Letsch
By Brown, Jackson, Boettcher & Dienner
Attys.

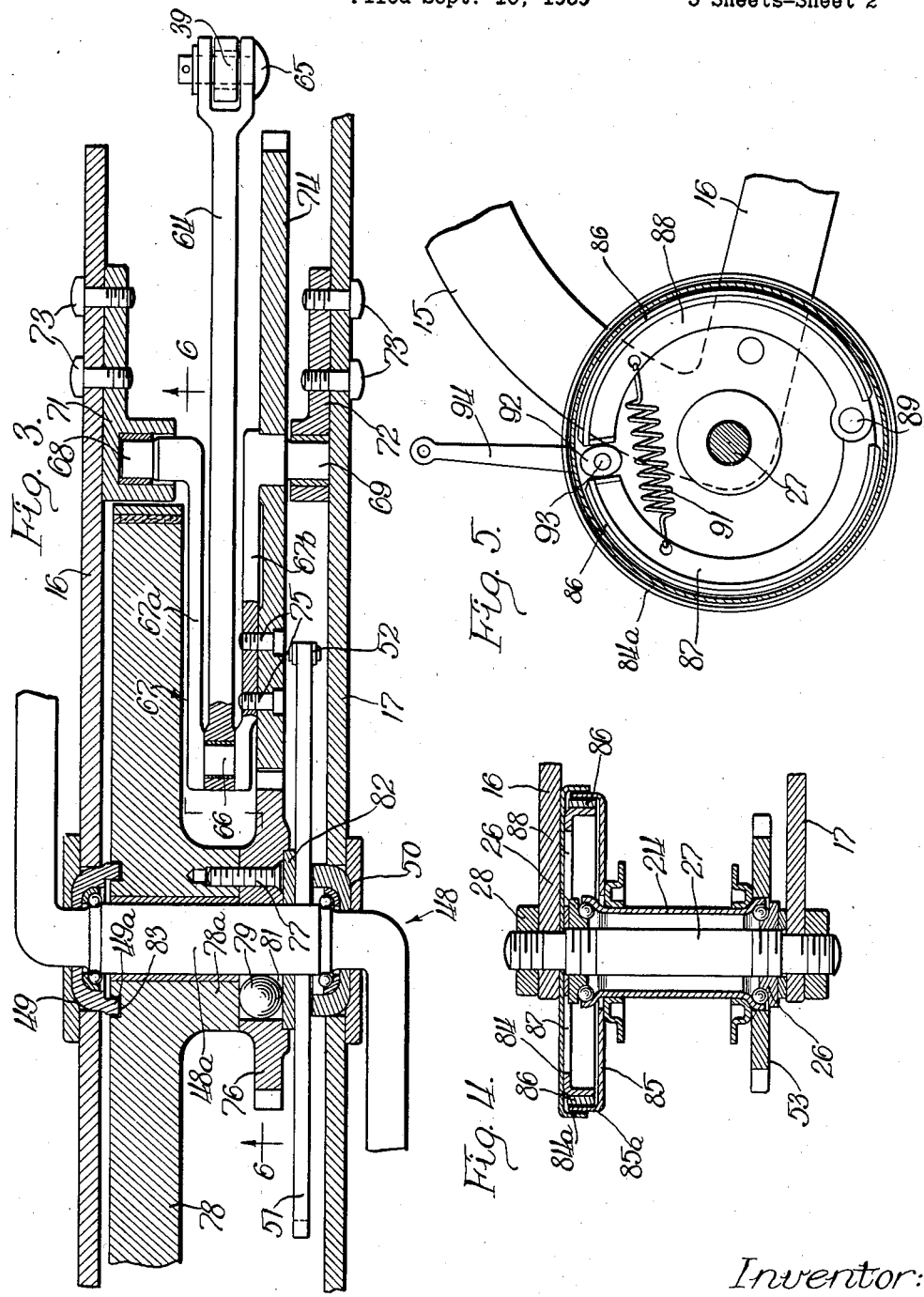

Feb. 18, 1941.    R. O. LETSCH    2,232,120
VEHICLE
Filed Sept. 16, 1939    3 Sheets-Sheet 3
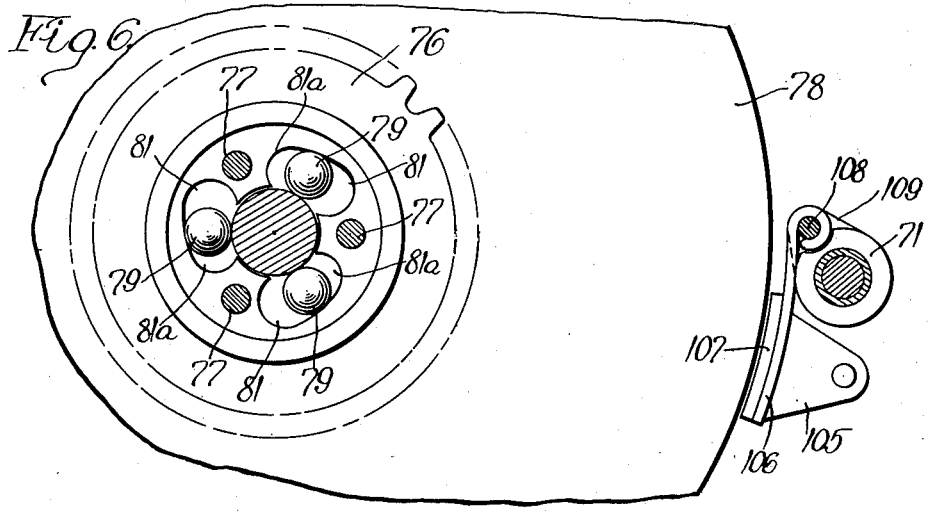
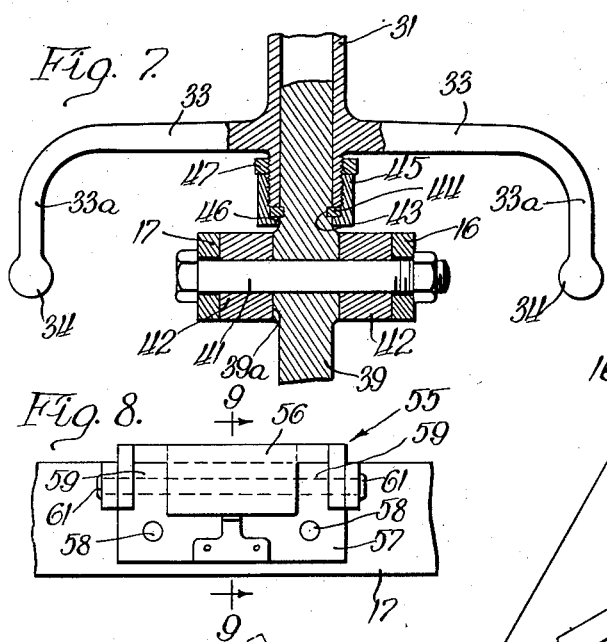
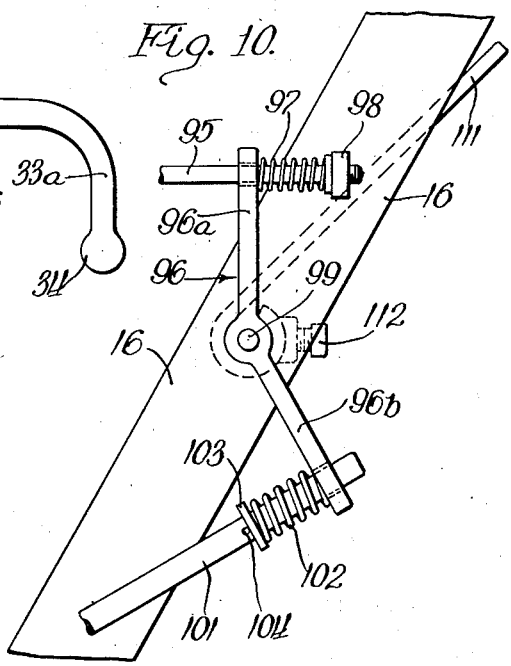
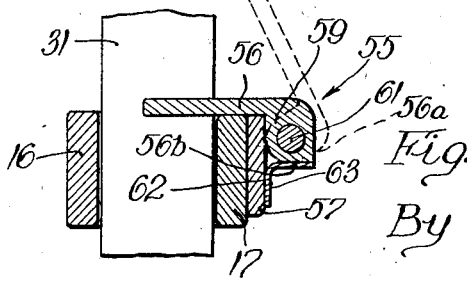
Inventor:
Raymond O. Letsch Patented Feb. 18, 1941

2,232,120

UNITED STATES PATENT OFFICE 2,232,120

VEHICLE

Raymond O. Letsch, Waterloo, Iowa

Application September 16, 1939, Serial No. 295,195

14 Claims. (Cl. 280—234)

My invention relates generally to vehicles of the type propelled, selectively, by either hand or foot power, or by both, simultaneously. More particularly, the invention relates to improvements in the mechanism for propelling and steering the vehicle. I have shown a bicycle as the vehicle embodying my invention. It will be apparent, however, that the invention may be employed with vehicles having additional ground engaging wheels.

Bicycles are generally provided with conventional driving means comprising a pedal crank rotatably mounted on the bicycle frame and having a sprocket gear fixed thereto, such sprocket gear being connected by a chain with a sprocket pinion suitably secured to the driven rear wheel of the bicycle. Rotation of the pedal crank by foot power propels the bicycle. The present invention contemplates propelling of a bicycle, selectively, through such a conventional drive, alone, or through such a drive connected to novel auxiliary driving means operated by combination hand and foot power, or by hand power alone.

One feature of the invention resides in the provision of auxiliary driving means operatively associated with the pedal crank and a lever rockably mounted on the bicycle frame, such means embodying an overrunning clutch mounted on the pedal crank and adapted for connection thereto upon operation of said lever. The provision of the overrunning clutch permits operation of the pedal crank by foot power to propel the bicycle through conventional drive alone. However, when the lever is rocked, by hand and foot power, or by hand power alone, the clutch becomes effective to rotate the pedal crank. Propelling of the bicycle is then accomplished by the lever through the combination of the conventional and auxiliary driving means.

Another feature of the invention resides in the mounting of an inertia member on the pedal crank and securing it to the overrunning clutch for operation thereby, said member under certain conditions dissipating its energy through means connecting such separate brake means together for operation by a single control.

Still further objects and advantages of my invention will in part be obvious and in part hereinafter pointed out, and they consist generally in the features of construction, combination of elements and arrangements of parts which will be exemplified in the construction to be described, and of which the scope of application will be indicated in the appended claims.

In the accompanying drawings, in which is shown the preferred illustrative embodiment of my invention,—

Figure 2 is a plan view of the vehicle of Figure 1;

Figure 3 is a horizontal sectional view through the auxiliary driving mechanism taken substantially along the line 3—3 of Figure 1;

Figure 4 is a horizontal sectional view through the rear wheel hub of the vehicle and associated parts, taken substantially along the line 4—4 of Figure 1;

Figure 5 is a vertical sectional view through the brake means associated with the rear wheel of the vehicle;

Figure 6 is a fragmentary view, partly in vertical section and partly in side elevation, through the auxiliary driving mechanism and the brake means for the inertia member, this view being taken substantially along line 6—6 of Figure 3;

Figure 7 is a vertical sectional view of the mounting means for the rockable lever, taken substantially along line 7—7 of Figure 1;

Figure 8 is an elevational view of latch means for the lever,

Figure 9 is a vertical sectional view taken substantially along line 9—9 of Figure 8; and Figure 10 is a fragmentary elevational view of control means for the brakes associated with the rear wheel and inertia member.

Figure 1:
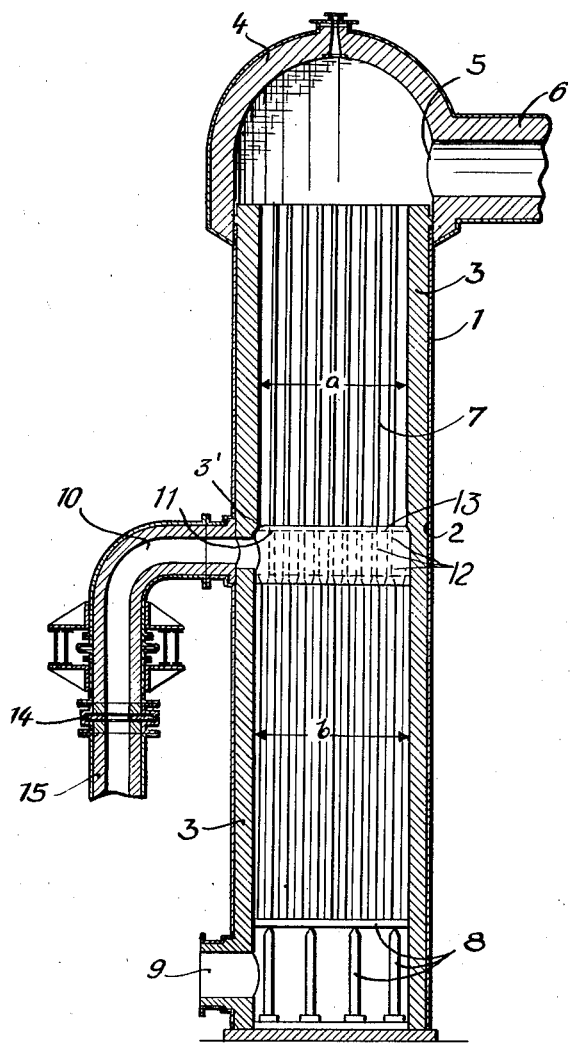
Figure 1 is a side elevational view of a vehicle embodying the present invention.

Referring now in detail to the drawings, the bicycle comprises the frame 12 having the upper horizontal tubular bar 13 extended between and hand lever receiving the portion of the extension above said ring and seating on said ring, means connected between said lever and ring restraining axial longitudinal movement of the lever with respect to the extension, an overrunning clutch on said crank shaft, and means connected between said clutch and the other end of said extension operative to connect said clutch to said crank shaft and impart rotation thereto upon rocking movement of said extension by said hand lever.

9. In a vehicle having a main frame supported upon wheels one of which is driven by the rotation of a crank shaft carried by said frame, and foot power means for rotating said shaft, means optionally rotating said crank shaft by hand power comprising an extension rockably mounted intermediate its ends on said frame, a snap ring carried by one end of said extension, a tubular hand lever receiving the portion of the extension above said ring and seating on the upper face of said ring, a cap having a flange engaging the opposite face of said ring and threaded on said lever to restrain axial longitudinal movement of the lever with respect to the extension, an overrunning clutch on said crank shaft, and means connected between said clutch and the other end of said extension operative to connect said clutch to said crank shaft and impart rotation thereto upon rocking movement of said extension by said hand lever.

10. In a bicycle comprising a main frame including front and rear forks receiving and supported on front and rear wheels, respectively, of a crank shaft rotatably carried on said frame, means connected between said shaft and rear wheel operable to drive said wheel upon rotation of said shaft, foot power means for rotating said shaft, hand power means for optionally rotating said shaft including a hand lever pivotally mounted on the frame for axial rotation and fore and aft rocking movement with respect to the frame, an overrunning clutch on said crank shaft operable by fore and aft rocking movement of said lever to impart rotation to said shaft, arms extended outwardly at diametrically opposite points on said lever and each terminating in a ball, the centers of said balls lying in a line drawn through the axis of said lever pivot, and rods connected between said balls and the front fork operable to steer the bicycle upon axial rotation of said lever.

11. In a vehicle having a main frame supported upon wheels one of which is driven, of a rotatable member carried by said frame, means connected between said member and driven wheel to drive said wheel upon rotation of said member, optional means for rotating said member, overrunning clutch means between said optional means and said member, an inertia member carried by the rotatable member and fixed to said overrunning clutch means for operation thereby, separate brake means for said driven wheel and said inertia member, and a common control member for simultaneously operating said brake means.

12. In a vehicle having a main frame supported upon wheels one of which is driven, of a rotatable member carried by said frame, means connected between said member and driven wheel to drive said wheel upon rotation of said member, optional means for rotating said member, overrunning clutch means between said optional means and said member, an inertia member carried by the rotatable member and fixed to said overrunning clutch means for operation thereby, separate brake means for said driven wheel and said inertia member, a common control member for simultaneously operating said brake means, and equalizing means between said brake means and said common control means.

13. In a vehicle having a main frame supported upon wheels one of which is driven by the rotation of a crank shaft carried by said frame, and foot power means for rotating said shaft, of means optionally rotating said crank shaft by hand power comprising a hand lever rockably mounted on said frame, a pair of rotatable members having rolling contact with each other, one of said members constituting an overrunning clutch adapted for connection to said crank shaft and the other member constituting a driving member for said clutch, and means connecting said latter member with said hand lever for operation thereby.

14. In a vehicle having a main frame supported upon wheels one of which is driven by the rotation of a crank shaft carried by said frame, and foot power means for rotating said shaft, of means optionally rotating said crank shaft by hand power comprising a hand lever rockably mounted on said frame, a pair of meshing oppositely rotating gear members, one of said members constituting an overrunning clutch carried by said crank shaft, the other member being journaled on said frame and constituting a driving member for said clutch, and link means connecting said latter member with said hand lever for operation thereby.

RAYMOND O. LETSCH.